Patented Sept. 14, 1948

2,449,340

UNITED STATES PATENT OFFICE 2,449,340

VITAMIN-B COMPLEX CONCENTRATE

Fred W. Tanner, Jr., and James M. Van Lanen, Peoria, Ill., assignors to the United States of America as represented by the Secretary of Agriculture No Drawing. Application September 24, 1946, Serial No. 699,074

2 Claims. (Cl. 99—9)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to the production by fermentation with fungi of the genus Penicillium of a feed supplement rich in vitamins B-complex.

We have discovered that an appreciable vitamin synthesis is effected by members of the genus Penicillium in the commercial production of penicillin. In this production, fermentation mediums comprising dilute aqueous solutions of carbohydrate and nitrogenous substances are fermented under conditions of agitation and aeration by certain members of the *Penicillium notatum-chrysogenum* group. At the conclusion of the fermentation when the highest desirable penicillin content is reached, the fermentation mash is filtered or centrifuged to separate mycelium and other suspended matter therefrom. This facilitates recovery of penicillin from the clear filtrate. Considerable growth of the fungus occurs during the fermentation, and the mycelium along with penicillin-free waste filtrate constitutes a serious waste disposal problem.

According to the present invention, the vitamin B complex synthesized in the process is recovered. The mycelium and other suspended matter obtained from the fermentation mash may be dried by conventional methods, such as passage over steam-heated drums, to remove the bulk of the water therefrom. In an alternative method enabling a more complete by-product recovery, the mycelium and other suspended matter are separated from the fermentation mash. The remaining clear filtrate liquor is processed for recovery of penicillin by conventional methods, such as solvent extraction or adsorption on activated agents. The penicillin-free liquors are collected and are evaporated, as by means of multiple-effect evaporators to a sirup, thus to remove the bulk of the water. This residue sirup is mixed with previously separated mycelium, and the combined materials are dried. If desired, the sirup and the mycelium products may be separately dried. When dried, the materials may be ground and used as such as a vitamin and protein feed supplement for animal and poultry uses.

While the synthesis of pantothenic acid by members of the *Penicillium notatum-chrysogenum* group is most pronounced, some improvement in all known B vitamins occurs. Other as yet unknown animal nutrition factors may also be synthesized.

The invention is further exhibited by the following examples:

EXAMPLE I

The fermentation medium employed had the following composition in the proportions indicated:

| | Grams |
|---|---|
| Lactose | 30 |
| Corn steep liquor (approximately 50 percent solids) | 80 |
| NaNO₃ | 3 |
| CaCO₃ | 10 |
| Tap water to make 1 liter. | |

Separate 35 l. portions of this composition, with the exception of the CaCO₃, were placed in 50 l. aluminum fermenters and sterilized at 17 pounds steam pressure (per square inch gage) for 60 minutes. After cooling, the sterile dry CaCO₃ was added. The pH before inoculation was 4.8. Each fermenter was inoculated with 1 l. of a 48-hour culture of *Penicillium chrysogenum* NRRL 1951.B25. The medium was maintained at a temperature of 24° to 25° C., was agitated continuously, and was aerated at the rate of 0.6 volume of air per volume of medium per minute.

Table 1 indicates results relative to the production of penicillin.

Table 1

| | Uninoculated, unfermented medium | Fermentation time, hours | |
|---|---|---|---|
| | | 96 | 137 |
| Lactose, g./100 ml | 2.9 | 2.0 | 1.1 |
| pH | 4.8 | 6.6 | 7.1 |
| Penicillin, units/ml | | 32.0 | 77.0 |
| Total solids, g./100 ml | 6.9 | 6.0 | 5.3 |
| Solids in filtrate, g./100 ml | | 4.7 | 3.0 |
| Mycelium, g./100 ml | | 1.3 | 2.3 |

Table 2 indicates results relative to the production of various members of the vitamin B-complex.

Table 2

| Vitamin | Uninoculated, unfermented medium | Fermentation time, hours | | | |
|---|---|---|---|---|---|
| | | Filtrate | | Mycelium | |
| | | 96 | 137 | 96 | 137 |
| Riboflavin μg./ml. | 0.4 | 0.8 | 0.2 | | |
| μg./g. dry substance | 5.7 | 16.1 | 7.3 | 32.0 | 47.5 |
| Nicotinic acid μg./ml. | 6.5 | 8.9 | 7.0 | | |
| μg./g. dry substance | 93.9 | 188.0 | 232.0 | 35.2 | 212.0 |
| Pantothenic acid μg./ml. | 1.8 | 11.9 | 17.9 | | |
| μg./g. dry substance | 26.4 | 250.0 | 592.0 | 22.8 | 107.7 |
| Pyridoxin μg./ml. | 1.8 | 1.2 | 2.5 | | |
| μg./g. dry substance | 25.4 | 26.0 | 82.5 | 8.8 | 24.6 |
| Biotin μg./ml. | 0.01 | 0.026 | 0.018 | | |
| μg./g. dry substance | 0.142 | .555 | .608 | 0.29 | 1.005 |

Tables 1 and 2 contain the analytical results obtained during the course of the fermentation. It will be noted in Table 2 that pantothenic acid in the cell-free liquor was increased from a level of 1.8 μg./ml. to 17.9 μg./ml., an overall increase of approximately ten-fold. Notable increases are also shown for other vitamins.

EXAMPLE II

To exhibit the effects of different strains of the organisms, nine strains of Penicillia, identified as members of the *Penicillium notatum-chrysogenum* group, were cultivated in 175 ml. of a corn steep liquor (2 percent dry basis) lactose-inorganic salts medium in liter Erlenmeyer flasks which were shaken continuously for seven days at 24° to 25° C. Analytical data are shown in Table 3. The column giving the penicillin yield is based on the highest potency reached during the seven-day incubation period. Strains indicated as (a) and (b) in the first column are different colonies isolated from the same parent strain.

Table 3

| Strain | Penicillin yield, units/ml. | Total solids, per cent | Riboflavin, mg./ml. | Pantothenic acid, mg./ml. | Nicotinic acid, mg./ml. | Pyridoxin, mg./ml. | Biotin, mg./ml. |
|---|---|---|---|---|---|---|---|
| Uninoculated medium | | | 0.09 | 1.3 | 3.0 | 0.7 | 0.008 |
| 1951.B25 (a) | 110 | 3.84 | .94 | 10.8 | 5.7 | 2.8 | .027 |
| 1951.B25 (b) | 90 | 4.50 | .96 | 10.0 | 6.1 | 2.2 | .028 |
| 1951.B11 (a) | 142 | 3.53 | 1.07 | 11.7 | 5.6 | 2.1 | .028 |
| 1951.B11 (b) | 94 | 3.54 | 1.00 | 9.4 | 5.7 | 2.2 | .026 |
| P. S. 261 (a) | 77 | 3.78 | .78 | 9.15 | 6.0 | 2.2 | .023 |
| P. S. 263 (a) | 104 | 3.75 | .75 | 12.4 | 5.7 | 1.7 | .024 |
| P. S. 264 (a) | 99 | 3.99 | .87 | 14.3 | 5.7 | 2.3 | .023 |
| P. S. 264 (b) | 29 | 3.25 | 1.36 | 10.7 | 6.1 | 3.2 | .026 |
| 832 (Abbott) | 67 | 3.90 | .92 | 13.9 | 5.9 | 2.3 | .024 |

It is evident from Table 3 that all strains tested synthesized members of the vitamin B-complex, but that the amount of a particular vitamin synthesized is characteristic of the culture chosen. Furthermore, synthesis of vitamins does not appear to correlate closely with penicillin synthesis.

Vitamin B-complex synthesis by members of the genus Penicillium is not limited to media containing lactose as a carbohydrate and corn steep liquor as a nitrogen and accessory growth factor source. Other media containing fermentable sugar and available nitrogen and other growth factors are capable of supporting equally high yields of the vitamins. Distillers' thin stillage is an example of crude materials which may be fortified with B-complex vitamins by cultivation of Penicillia cultures as more fully exhibited in Example III.

EXAMPLE III

Four stock cultures of the genus Penicillium were cultivated in separate portions of distillers' thin stillage fortified with 2 percent glucose and 1 percent calcium carbonate. The media were adjusted to pH 5 and sterilized in 150 ml. amounts in liter Erlenmeyer flasks. These were inoculated and incubated at 30° C. for five days with continuous shaking. After the incubation period, samples were removed for vitamin analysis. Analyses are recorded in Table 4.

Table 4

| Penicillium culture | Riboflavin, mg./ml. | Pantothenic acid, mg./ml. | Nicotinic acid, mg./ml. | Pyridoxin, mg./ml. | Biotin, mg./ml. |
|---|---|---|---|---|---|
| Uninoculated control | 0.43 | 3.6 | 6.2 | 0.40 | .018 |
| P. utricae | .72 | 14.2 | 4.3 | .73 | .031 |
| P. intricatum | 1.31 | 14.8 | 4.5 | 1.07 | .035 |
| P. stoloniferum | 1.10 | 7.9 | 14.5 | .86 | .034 |
| P. stoloniferum | 1.24 | 7.5 | 12.8 | .68 | .034 |

Table 4 shows that distillers' thin stillage may be markedly increased in vitamin content by fermentation with Penicillia. These refermented materials may be prepared in dry form by suitable known methods.

The vitamin concentrates prepared from residues of Penicillia fermentations may be used as a source of B-complex vitamins in formulating animal and poultry feeds. They are particularly useful in fortifying nutritionally deficient feed ingredients to the extent that the well-being of the animal is maintained, and the composite feed is utilized most efficiently. These materials have been fed successfully as adjuncts to standard grain feeds without toxic effects. Furthermore, feeding tests have demonstrated their ability to replace vitamin concentrates customarily employed in formulating nutritionally balanced feeds.

The process is applicable generally to fermentations conducted by any strains of Penicillia. Furthermore, it may be applied to any material containing fermentable carbohydrate or to which an adequate amount of fermentable carbohydrate is supplied and which satisfies the other growth requirements of the Penicillium organism in question.

Having thus described the invention, what is claimed is:

1. A method for producing a feed supplement rich in vitamin B-complex, comprising fermenting an aqueous fermentation medium under conditions of agitation and aeration by fungi of the *Penicillium notatum-chrysogenum* group, and recovering the feed supplement from the fermentation mash by removing the bulk of the water therefrom.

2. The method of claim 1, characterized in that the mycelium and other suspended matter is separated from the fermentation mash and the bulk of the water is removed from the remaining liquid, the residue being mixed with the separated mycelium and other suspended matter and the combined materials dried to produce the feed supplement.

FRED W. TANNER, Jr.
JAMES M. VAN LANEN.

REFERENCES CITED

The following references are of record in the file of this patent:

UNITED STATES PATENTS

| Number | Name | Date |
|---|---|---|
| 1,756,574 | Takamine | Apr. 29, 1930 |
| 2,370,177 | Legg et al. | Feb. 27, 1945 |
| 2,400,710 | Piersma | May 21, 1946 |